Figure 1:
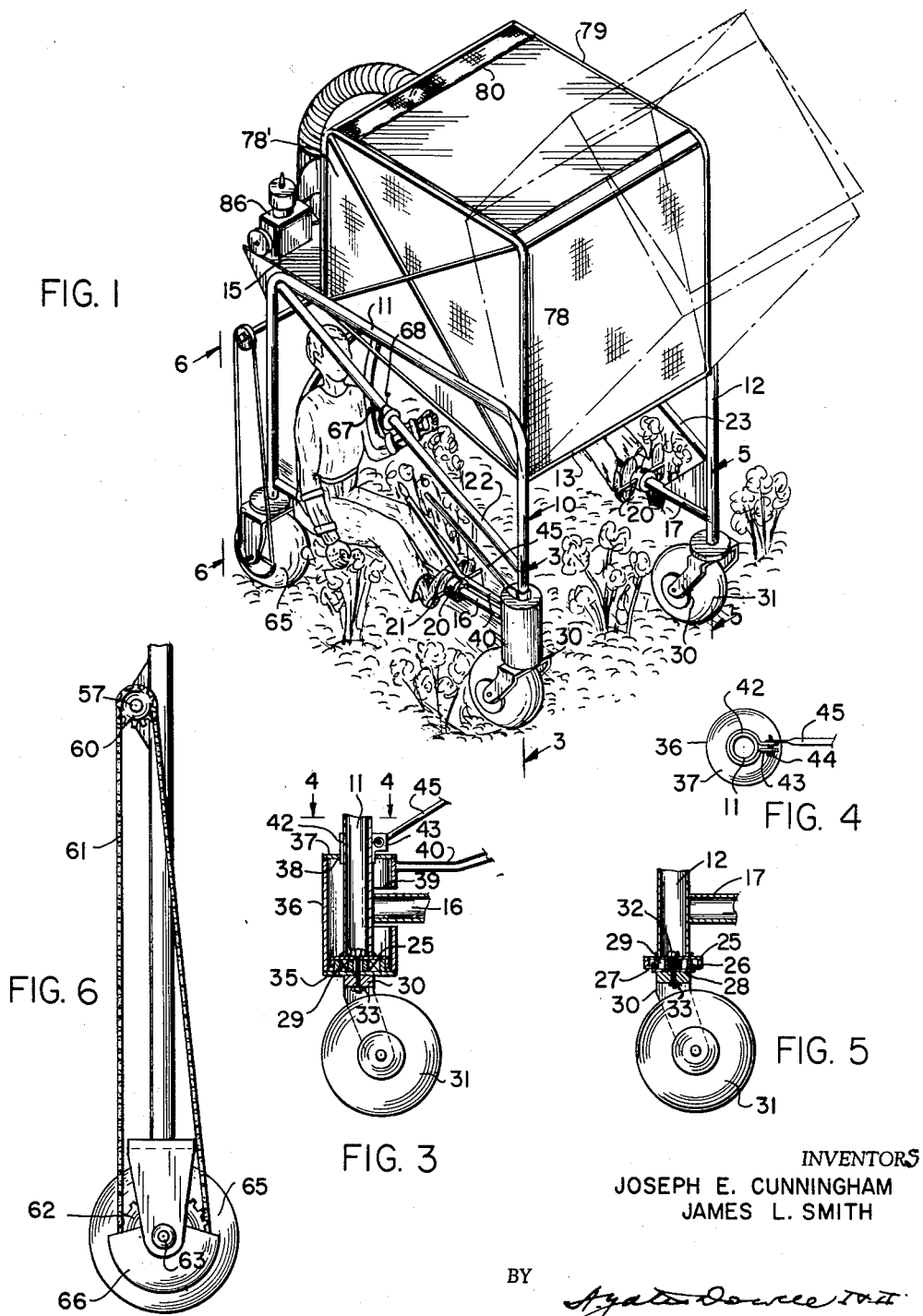

March 31, 1964 J. E. CUNNINGHAM ETAL 3,127,036
COTTON HARVESTER
Filed July 10, 1962 2 Sheets-Sheet 1

INVENTORS
JOSEPH E. CUNNINGHAM
JAMES L. SMITH

BY
ATTORNEY

March 31, 1964 — J. E. CUNNINGHAM ETAL — 3,127,036
COTTON HARVESTER

Filed July 10, 1962 — 2 Sheets-Sheet 2

INVENTORS
JOSEPH E. CUNNINGHAM
JAMES L. SMITH

BY
ATTORNEY

United States Patent Office 3,127,036
Patented Mar. 31, 1964

3,127,036
COTTON HARVESTER
Joseph E. Cunningham, 3062 E. Glengarry Road, Memphis 8, Tenn., and James L. Smith, 3832 Argonne St., Memphis 7, Tenn.
Filed July 10, 1962, Ser. No. 208,810
1 Claim. (Cl. 214—83.1)

This invention relates to the cultivation, harvesting and handling of crops of various kinds such as cotton and the like, including apparatus or equipment utilized for facilitating the accomplishment of the desired operations.

The invention relates particularly to mobile self propelled mechanism for use in the cultivation and harvesting of crops such as cotton and the like, such mobile mechanism being constructed to carry workmen and to improve the amount of work accomplished and the time involved.

Heretofore harvesters have been provided for cotton, tobacco and the like, some of which have been self-propelled, equipped to carry workmen, and to perform other operations, including the actual harvesting of the cotton, tobacco or the like, and in the harvesting of cotton, it has been readily recognized that there is a considerable difference between the quality of the product when harvested by a machine as compared with when harvested by workmen, hand harvested products usually being more carefully and intelligently handled, but hand harvesting has involved more workmen as well as greater time, and expense.

It is an object of the invention to provide a machine which combines both the human and the mechanical abilities thereby making it possible that the product harvested be of the finest quality, and that the harvesting be accomplished with the least effort, in the least time and at minimum expense.

Another object of the invention is to provide a relatively simple self-propelled machine capable of carrying workmen through a field of growing cotton or other crop, at a rate of speed much faster than the normal speed of a workman but with the workman supported in a manner that he can readily harvest cotton or other product with mechanical means for moving or collecting the harvested product to eliminate unnecessary motion on the part of the operator.

Another object of the invention is to provide a cotton harvester including a relatively simple wheel supported steerable vehicle frame, driven by a relatively small lightweight motor or prime mover and having seats for workmen, a container for cotton or other product, and suction mechanism in close proximity to the hands of the workmen so that when the product is detached it readily may be withdrawn by suction to reduce to a minimum the work necessary to perform the harvesting, or other operation.

Figure 2:
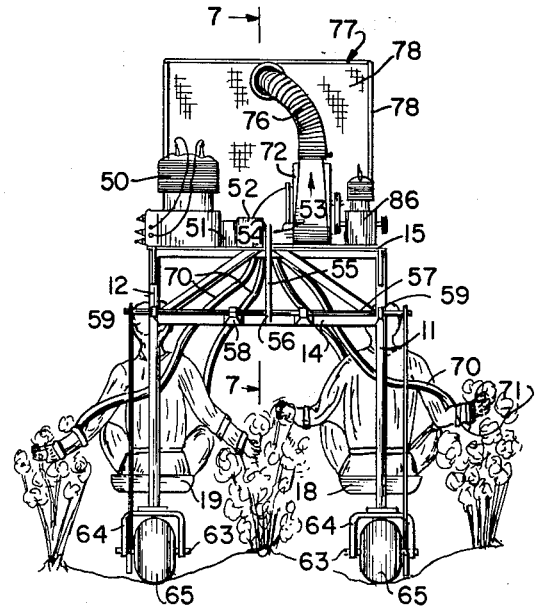
Figure 7:
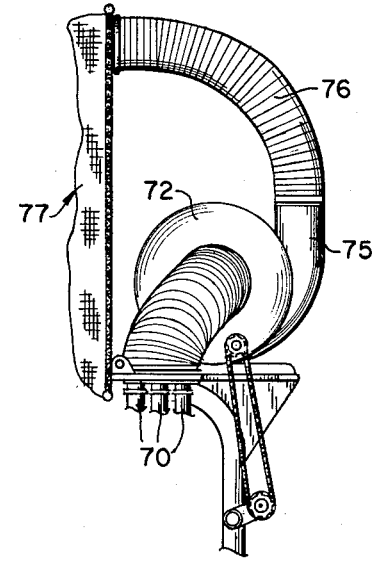
Figure 9:
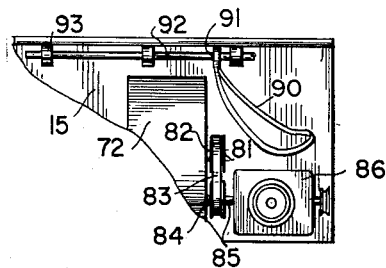
Figure 10:
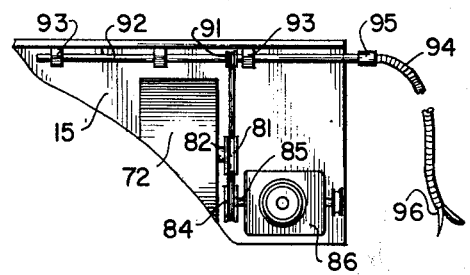
Figure 11:
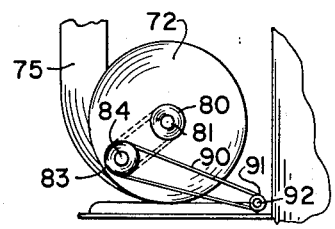
Figure 8:
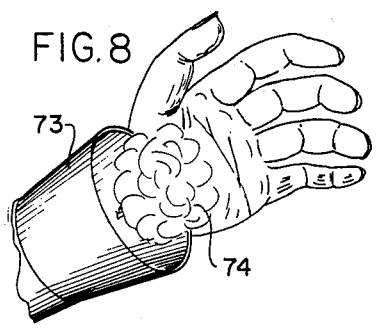

Other objects and advantages of the invention will be apparent from the following description taken in conjunction with the accompanying drawings wherein:

FIG. 1 is a perspective illustrating one application of the invention in use,

FIG. 2, a rear end elevation of the machine,

FIG. 3, a vertical section on line 3—3 of FIG. 1, illustrating the mounting of the steerable wheel, FIG. 4, a horizontal section on line 4—4 of FIG. 3, FIG. 5, a vertical section on the line 5—5 of the other front caster wheel, FIG. 6, a side elevation illustrating the manner of driving each of the rear wheels, FIG. 7, an enlarged central vertical section on the line 7—7 of FIG. 2, FIG. 8, an enlarged fragmentary perspective illustrating the proximity of the suction nozzle for the workman's hand, FIG. 9, a fragmentary top plan view of the rear top portion of the machine containing the motor and the blower for driving the same, FIG. 10 is a view similar to the view of FIG. 9, with the motor connected to a shaft for driving the cultivating implement, and, FIG. 11 is a side elevation of the structure of FIG. 10.

Briefly stated, the invention is a self-propelled vehicle for use in the cultivation and harvesting of cotton by which the advantages of human ingenuity and skill are imparted to a machine particularly with regard to facility and speed of operation.

With continued reference to the drawings, the present invention includes a frame 10 having inverted U-shaped side members 11 and 12 joined by a front cross bar or connection 13, a rear cross bar or connection 14 and an upper platform 15. The side members 11 and 12 are connected adjacent their free ends by longitudinal bars 16 and 17, respectively, on which seats 18 and 19 are mounted. An axially slidable collar 20 having outwardly projecting lugs 21 is adjustably mounted on each of the rods 16 and 17 and adapted to form a foot rest for workers sitting on seats 18 and 19. Diagonal braces 22 and 23 are provided on each of the side members 11 and 12, respectively, to add rigidity to the frame and such braces are permanently attached as by welding.

The forward free ends of the frames 11 and 12 are welded or otherwise attached to a plate 25 (FIGS. 3 and 5) having a depending flange 26 which overlies an upstanding flange 27 of a cup member 28. A thrust bearing 29 is mounted between the plate 25 and the cup 28 in such a manner that the cup 28 is rotatable relative to the plate 25.

In order for the vehicle to move through a field, the cup 28 is connected to a yoke or caster type of wheel mount 30 on which wheels 31 are mounted. The plate 25, bearing 29, cup 28 and yoke 30 are connected by a bolt 32 welded or otherwise permanently attached to the plate 25 and such bolt extends downwardly through the assembly and receives a nut 33 for maintaining the units in assembled relation.

In order to steer the vehicle, the cup 28 on the forward end of the frame 11 is provided with an outwardly extending flange 35 which is welded or otherwise attached to an upwardly extending cylinder 36, the upper end of which is closed by a plate 37 permanently attached to such cylinder. The plate 37 has an opening 38 through which one leg of the side member 11 extends. A slot 39 is provided in the rearmost portion of the cylinder intermediate its ends to accommodate the longitudinal bar 16 and permit the cylinder to rotate relative to the fixed frame. The cylinder 36 has a lever 40 attached to its upper portion and extending rearwardly thereof into proximity with a worker sitting on the seat 18 so that such worker, by moving the rod 40, can control the direction of movement of the vehicle. If desired, a clamp 42 may extend through the opening 38 and be welded to the plate 37 along the forward portion thereof and such clamp extends around the downwardly extending portion of the U-shaped member 11 and terminates in rearwardly extending lugs 43. The lugs 43 are connected by a bolt 44, the end of which threadedly receives one end of a lever 45 in such a manner that when the lever 45 is moved in one direction the clamp 42 will engage member 11 and prevent rotation of the cylinder 36 and when moved in the opposite direction such clamp will be released and the cylinder will be free to rotate.

In order to propel the vehicle, a motor or other prime mover 50 is mounted on the platform 15 and is connected through a clutch 51 to a transmission gear box 52. Such gear box has a power transmitting shaft 53 projecting outwardly therefrom on which a sprocket 54 is keyed or otherwise attached and such sprocket drives a chain 55 which in turn rotates a sprocket 56 fixed on a drive shaft 57. Drive shaft 57 is supported by bearings 58 on the cross member 14 and by bearings 59 mounted on frame members 11 and 12. In order to transmit power to the rear wheels of the vehicle, a sprocket 60 is mounted on each end of the shaft 57 and each of such sprockets drives a chain 61 which extends downwardly around sprockets 62. Each of the sprockets 62 is mounted on an axle 63 rotatably carried in an inverted U-shaped yoke 64 fixed to the rear free ends of the frame members 11 and 12. Drive wheels 65 are fixed to each of the axles 63 so that upon rotation of the sprockets 62, the drive wheels will propel the vehicle. If desired, the sprocket 62 may be protected by a shield 66. The forward movement of the vehicle is controlled by the worker who is driving through a clutch lever 67 and a gear shift lever 68 mounted on the brace 22.

In order to combine the benefits of hand-picked cotton with the speed and efficiency of a mechanized picker, each of the workers has a hose 70 connected to each of his arms by straps 71 and such hoses are connected at one end to a source of suction such as a blower 72. As illustrated in FIG. 8, the free ends of the hoses which are strapped to the worker's arms terminate in a frustoconical mouth 73 located adjacent to the base of the palm of the worker's hand so that when the worker picks a boll of cotton 74 with his fingers he merely releases the boll and such boll is drawn up through the hose 70 into the blower 72. Such blower has a discharge chute 75 connected by a flexible pipe 76 to a basket or container 77 which receives the cotton bolls from the blower. The container 77 preferably is constructed of a tubular framework 78 surrounded by wire mesh 78' and having a top discharge cover 79 mounted on the framework by a hinge 80.

In order to discharge the cotton from the container, such container is hingedly mounted to the front cross member 13 in such a manner that when the container has been filled it may be tilted as indicated in phantom in FIG. 1 to discharge the cotton through the discharge cover 79.

The blower 72 is adapted to be rotated to provide a source of suction by a pulley 81 mounted on a shaft 82 of the blower and such pulley is driven by a belt 83 which in turn is driven by a pulley 84 mounted on the shaft 85 of an internal combustion engine 86.

The description thus far has related to the harvesting of cotton, which is the primary function of the machine. However, as illustrated in FIGS. 9, 10 and 11, the belt 83 may be removed from pulleys 81 and 84 and an auxiliary belt 90 may be placed on the pulley 84 in order to drive a pulley 91 fixed on a shaft 92 mounted in bearings 93 carried by the forward portion of the platform 15. The shaft 92 is adapted to be connected at each of its free ends to a flexible shaft housing 94 by a connection 95. The free end of the flexible shaft housing 94 is adapted to receive and drive cultivating tools such as cutters, choppers or other tools which may be attached by the workers to thin crops, weed, cultivate or spray the cotton during the growing season.

It will be obvious to those skilled in the art that various changes may be made in the invention without departing from the spirit and scope thereof and therefore the invention is not limited by that which is illustrated in the drawings and described in the specification, but only as indicated in the accompanying claim.

What is claimed is:

A cotton harvester comprising a receptacle for picked cotton, said receptacle having a top opening, lightweight frame structure of near the same size as and pivotally mounting said receptacle adjacent the top thereof whereby cotton may be discharged through said top opening upon the pivoting of said receptacle, a prime mover mounted on said frame structure, means for propelling said frame structure from said prime mover, at least one seat for a workman carried by said frame structure below said receptacle, steering means carried by said frame structure in a position conveniently accessible to said workman, suction means on said harvester including a flexible conduit for conveying picked cotton into said receptacle and having at least one movable suction nozzle with means for securing the latter to the arm of the workman adjacent his hand, whereby a relatively compact lightweight self-propelled workman-carrying machine is provided by which one person may operate said harvester and pick cotton while riding thereon.

References Cited in the file of this patent
UNITED STATES PATENTS

| | | |
|---|---|---|
| 603,697 | Luce | May 10, 1898 |
| 722,488 | Campbell et al. | Mar. 10, 1903 |
| 923,649 | Hamilton | June 1, 1909 |
| 1,441,789 | Doubleday | Jan. 9, 1923 |
| 1,916,704 | Willett et al. | July 4, 1933 |
| 1,941,124 | Ziegler | Dec. 26, 1933 |
| 2,317,606 | Harris | Apr. 27, 1943 |
| 2,440,770 | Hagen | May 4, 1948 |
| 2,518,965 | Whitley | Aug. 15, 1950 |
| 2,655,957 | Lagant | Oct. 20, 1953 |
| 2,947,571 | Hagen | Aug. 2, 1960 |
| 3,066,947 | Himmelberger | Dec. 4, 1962 |

FOREIGN PATENTS

| | | |
|---|---|---|
| 822,735 | Germany | Nov. 29, 1951 |